US008320923B2

(12) United States Patent
Hergenhan et al.

(10) Patent No.: US 8,320,923 B2
(45) Date of Patent: Nov. 27, 2012

(54) METHOD AND APPARATUS FOR VALIDATING RADIO RESOURCE CONTROL MESSAGES

(75) Inventors: Scott Hergenhan, Collegeville, PA (US); William Francoeur, Royersford, PA (US)

(73) Assignee: Interdigital Technology Corporation, Wilmington, DE (US)

( * ) Notice: Subject to any disclaimer, the term of this patent is extended or adjusted under 35 U.S.C. 154(b) by 939 days.

(21) Appl. No.: 11/312,006

(22) Filed: Dec. 20, 2005

(65) Prior Publication Data

US 2006/0223551 A1 Oct. 5, 2006

Related U.S. Application Data

(60) Provisional application No. 60/667,449, filed on Apr. 1, 2005.

(51) Int. Cl.
*H04W 72/00* (2009.01)
(52) U.S. Cl. ............. 455/450; 455/90.2; 455/550.1; 370/329; 370/330; 370/913
(58) Field of Classification Search ............. 370/254, 370/329; 455/90.2, 450
See application file for complete search history.

(56) References Cited

U.S. PATENT DOCUMENTS

| 6,826,193 | B1 | 11/2004 | Peisa |
| 7,406,314 | B2 | 7/2008 | Sharma |
| 2003/0003895 | A1 | 1/2003 | Wallentin et al. |
| 2003/0203736 | A1 | 10/2003 | Chi et al. |
| 2004/0266461 | A1 | 12/2004 | Beckmann et al. |
| 2005/0053043 | A1 | 3/2005 | Rudolf et al. |
| 2005/0094656 | A1 | 5/2005 | Rao et al. |
| 2005/0101298 | A1* | 5/2005 | Norton et al. ............. 455/412.1 |
| 2005/0266846 | A1* | 12/2005 | Kim ............................ 455/436 |
| 2007/0275712 | A1* | 11/2007 | Sebire et al. ................. 455/424 |
| 2008/0039106 | A1* | 2/2008 | Wallentin et al. ............ 455/450 |

FOREIGN PATENT DOCUMENTS

| KR | 20010044918 | 6/2001 |
| WO | 03/049320 | 6/2003 |
| WO | 2004/034680 | 4/2004 |
| WO | 2004/100402 | 11/2004 |
| WO | 2004/100585 | 11/2004 |
| WO | 2004/102837 | 11/2004 |
| WO | 2004/114574 | 12/2004 |
| WO | 2005/125107 | 12/2005 |

OTHER PUBLICATIONS

ETSI TS 25 125 331 V6.5.0 (Mar. 2005) Universal Mobile Telecommunications System (UMTS); Radio Resource Control (RRC) protocol specification (3GPP TS 25.331 version 6.5.0 Release 6).

(Continued)

*Primary Examiner* — Vladimir Magloire
(74) *Attorney, Agent, or Firm* — Volpe and Koenig, P.C.

(57) ABSTRACT

A method for validating radio resource control (RRC) messages begins by receiving a RRC message at a wireless transmit/receive unit (WTRU) from a radio access network. A determination is made at the WTRU whether the message is valid by applying a predetermined validation rule. The WTRU accepts the message if the message is valid. The WTRU rejects the message if the message is not valid. The message is rejected unless a new transport format combination set (TFCS) is provided, until the WTRU enters a CELL_DCH state, or both.

10 Claims, 2 Drawing Sheets

OTHER PUBLICATIONS

ETSI TS 25 125 331 V6.7.0 (Sep. 2005) Universal Mobile Telecommunications System (UMTS); Radio Resource Control (RRC) protocol specification (3GPP TS 25.331 version 6.7.0 Release 6).

European Telecommunications Standards Institute, "Universal Mobile Telecommunications System (UMTS); Radio Resource Control (RRC) Protocol Specification," ETSI TS 25 125 331 v.6.5.0 (Mar. 2005) (3GPP TS 25.331 v6.5.0 Release 6).

European Telecommunications Standards Institute, "Universal Mobile Telecommunications System (UMTS); Radio Resource Control (RRC) Protocol Specification," ETSI TS 25 125 331 v6.5.0 (Mar. 2005) (3GPP TS 25.331 v6.5.0 Release 6).

European Telecommunications Standards Institute, "Universal Mobile Telecommunications System (UMTS); Radio Resource Control (RRC) Protocol Specification," ETSI TS 25 125 331 v6.7.0 (Sep. 2005) (3GPP TS 25.331 v6.7.0 Release 6).

Vales-Alonso et al., "Selective Interceptors for the UMTS Terrestrial Radio Access Network," Vehicular Technology Conference, Sep. 26-29, 2004, pp. 5265-5270.

* cited by examiner

METHOD AND APPARATUS FOR VALIDATING RADIO RESOURCE CONTROL MESSAGES

CROSS REFERENCE TO RELATED APPLICATION

This application claims the benefit of U.S. Provisional Application No. 60/667,449, filed on Apr. 1, 2005, which is incorporated by reference as if fully set forth herein.

FIELD OF INVENTION

The present invention generally relates to wireless communication systems, and more particularly, to a method and apparatus for validating radio resource control messages.

BACKGROUND

The 3GPP standard 25.331 specifies the radio resource control (RRC) protocol for the radio interface between a wireless transmit/receive unit (WTRU) and a UMTS terrestrial radio access network (UTRAN). Section 8.6 of standard 25.331 describes the rules that the WTRU must follow for validating downlink peer messages received from the UTRAN. Included in this section are rules regarding transport channel information elements (IEs).

Specifically, the standard states in Section 8.6.5.2 that if the IE "Transport format combination set" is not included and either (1) if no transport format combination set is stored in the WTRU; or (2) if transport channels are added or removed in the message; or (3) if any transport channel is reconfigured in the message such that the size of the transport format set is changed, then the WTRU shall set the variable INVALID_CONFIGURATION to TRUE.

This means that if the any of the above conditions are met, the WTRU should reject the peer message. The rule does not take additional information into account, such as the type of transport channel being modified, the configured RRC state of the WTRU, etc.

The two basic operational modes of a WTRU are "Idle" and "Connected" modes. The Connected mode is further divided into several RRC states (i.e., a CELL_DCH state, a CELL_FACH state, a CELL_PCH state, and a URA_PCH state), which define the kind of channels that the WTRU is using. In the CELL_DCH state, dedicated channels are allocated to the WTRU. In the CELL_FACH state, no dedicated channel is allocated for the WTRU but the WTRU uses common channels which are shared by all WTRUs. While in the CELL_FACH state, the WTRU may receive (and must retain) certain information regarding dedicated channels. This information may then be used by the WTRU if the WTRU is directed by UTRAN to transition into the CELL_DCH state.

During an interoperability test session, a WTRU under test failed several connection attempts. Analysis showed that the WTRU was rejecting the network's RRC connection setup message because it broke the validation rule. Specifically, the message was directing the WTRU to the CELL_FACH state and was adding a dedicated transport channel, but was not including a transport format combination set (TFCS). The problem was that the validation rule was indeed broken as written. Based on this test result, the implementation of the validation rule could benefit from being more flexible.

Network operators may be tempted to read this rule liberally, thinking that the rule should only apply to transport channel elements that the WTRU will use in its immediately configured RRC state. The temptation (and perhaps confusion) is reinforced by the current ASN. 1 message syntax which requires networks to add dedicated transport channels to all WTRUs upon RRC connection setup, even those being configured for the CELL_FACH state. However, simply delaying an application of the rule until such time as the channels will be used (i.e., when the WTRU is configured for CELL_DCH) will not suffice since the rule is transaction-based. By applying the rule as it is written, the WTRU may reject an operable configuration (such as in the case described above). But by delaying the application of the rule, as the following example shows, the WTRU may accept an inoperable configuration, which is arguably worse.

For example, consider a WTRU that is operating in a CELL_DCH state. A UTRAN sends a message to the WTRU directing it to a CELL_FACH state and removing a transport channel, but not including a new TFCS. The WTRU accepts this message because the transport channels will not be used in the CELL_FACH state. A UTRAN sends a message to the WTRU directing it to a CELL_DCH state, including neither new transport channel information nor a new TFCS. The WTRU accepts this message because it does not break the validation rule. However, the WTRU will not be able to operate in the CELL_DCH state because it lacks the appropriate transport channel information or TFCS.

SUMMARY

A method for validating RRC messages begins by receiving a RRC message at a WTRU from a radio access network. The WTRU determines whether the message is valid by applying a predetermined validation rule to the message, examining the current need for a new TFCS in the WTRU, and examining the RRC state for which the WTRU is configured. The WTRU accepts the message if the message is valid. The WTRU rejects the message if the message is not valid.

A WTRU for validating RRC messages includes a receiver, a rule application device, a message accepting device, and a message rejecting device. The receiver is configured to receive a RRC message from a radio access network. The rule application device is configured to determine whether the message is valid by applying a predetermined validation rule. The message accepting device is configured to accept the message if the message is valid. The message rejecting device is configured to reject the message if the message is not valid.

BRIEF DESCRIPTION OF THE DRAWINGS

A more detailed understanding of the invention may be had from the following description of a preferred embodiment, given by way of example, and to be understood in conjunction with the accompanying drawings, wherein.

DETAILED DESCRIPTION OF THE PREFERRED EMBODIMENTS

Hereafter, the term "wireless transmit/receive unit" (WTRU) includes, but is not limited to, a user equipment, a mobile station, a fixed or mobile subscriber unit, a pager, or any other type of device capable of operating in a wireless environment. When referred to hereafter, the term "base station" includes, but is not limited to, a Node B, a site controller, an access point, or any other type of interfacing device in a wireless environment.

If a WTRU wants to allow for a liberal interpretation of the validation rule as defined in the standard (and therefore operate in the most networks possible) and still protect itself against invalid configurations, the WTRU must perform transport channel validation in a manner not described in the standard.

Figure 1:
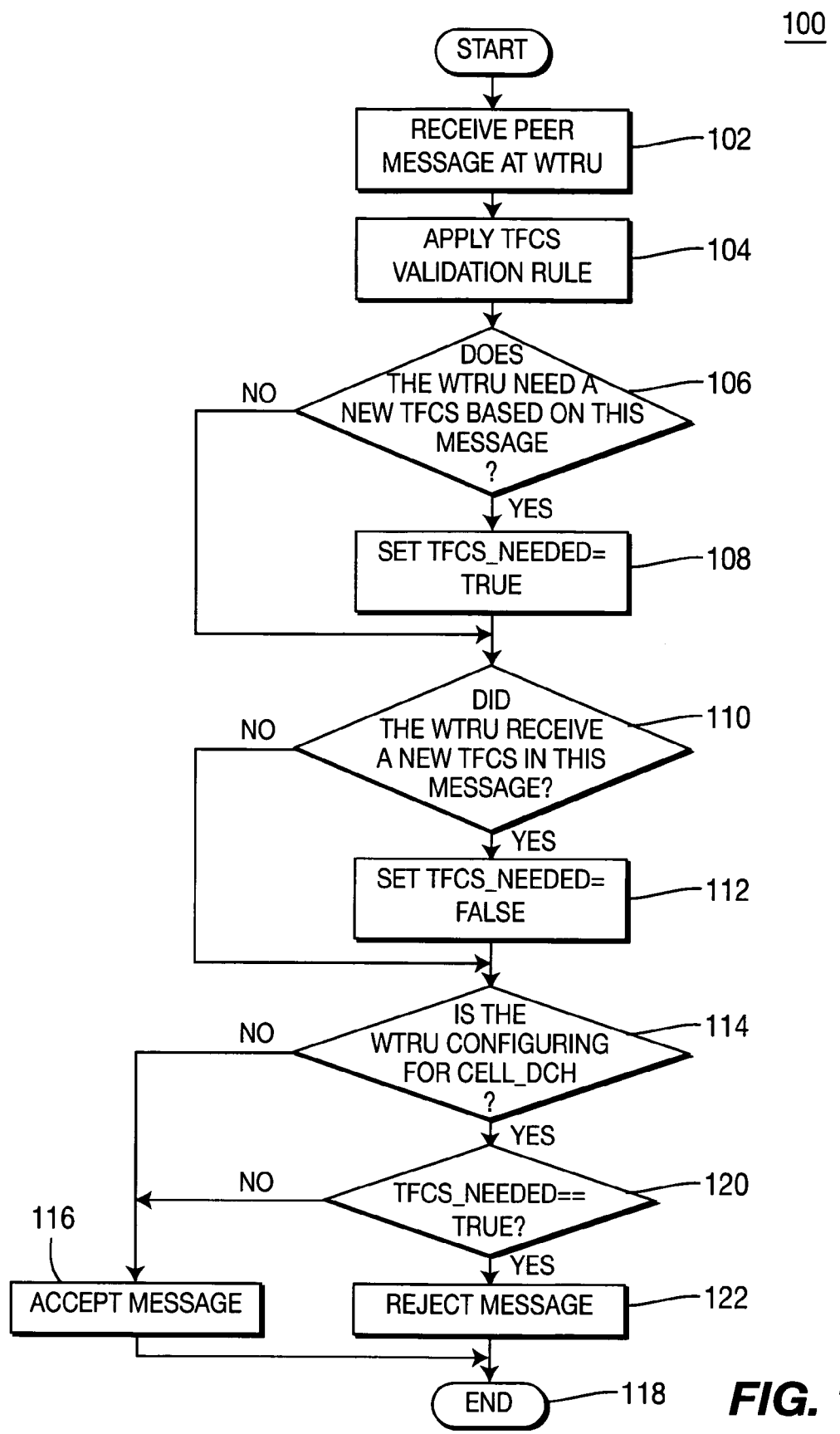
FIG. 1 is a flowchart of a method for applying a validation rule to an incoming RRC message.

FIG. 1 is a flowchart of a method 100 for applying the standard validation rule to an incoming message. The method 100 begins by receiving a peer message at a WTRU (step 102). The WTRU applies the validation rule to the received message (step 104). A determination is made whether the WTRU needs a new TFCS based on the received peer message (step 106). If the WTRU needs a new TFCS, then a TFCS indicator (e.g., a TFCS_NEEDED flag) is set to true (step 108). The TFCS indicator is maintained in the WTRU. If the WTRU does not need a new TFCS, then the TFCS indicator is left unchanged.

Next, a determination is made whether the WTRU received a new TFCS in the received peer message (step 110). If the WTRU received a new TFCS, then the TFCS indicator (e.g., the TFCS_NEEDED flag) is set to false (step 112). If the WTRU did not receive a new TFCS, then the TFCS indicator is left unchanged.

A determination is then made whether the WTRU is configuring itself for the CELL_DCH state based on the received peer message (step 114). If the WTRU is not configuring itself for the CELL_DCH state, then the message is accepted (step 116) and the method terminates (step 118). If the WTRU is configuring itself for the CELL_DCH state (step 114), then the TFCS indicator is evaluated to determine if it is set to true or false (step 120). If the TFCS indicator is set to true, then the WTRU rejects the message (step 122) and the method terminates (step 118). Since the WTRU needs a new TFCS and the network has not supplied the new TFCS during configuration for the CELL_DCH state, the message is properly rejected. If the TFCS indicator is set to false, then the message is accepted (step 116) and the method terminates (step 118). Since the network has supplied the WTRU with a new TFCS prior to or during configuration into the CELL_DCH state, the WTRU correctly accepts the message. In all cases, the WTRU continues operating error-free in the data plane.

The present invention allows the WTRU to operate on networks that interpret the validation rule liberally. The present invention also allows the WTRU to still protect itself against invalid configurations and, therefore, continue operating without self-induced errors in the data plane (leading to less retry and/or fallback handling, and ultimately fewer dropped calls).

Alternatively, the WTRU may not apply the TFCS validation rule, but the WTRU risks accepting invalid configurations or dropping calls. Another alternative is that the WTRU may delay applying the cited TFCS validation rule until the WTRU is configured for the CELL_DCH state. In this case, the WTRU also risks accepting invalid configurations or dropping calls.

Figure 2:
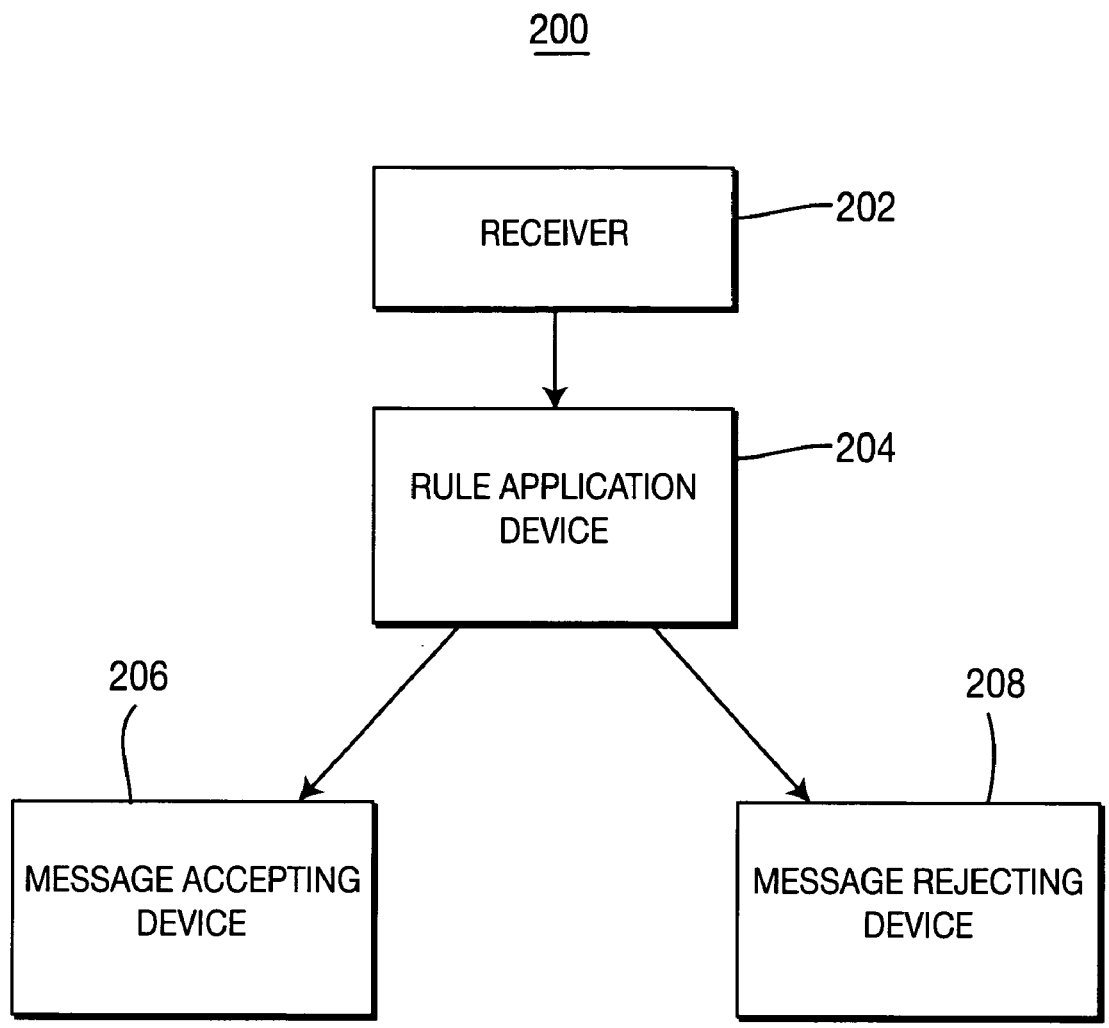
FIG. 2 is a block diagram of a device configured to apply a validation rule to an incoming RRC message.

FIG. 2 is a block diagram of a device 200 configured to apply a validation rule to an incoming RRC message. In a preferred embodiment, the device 200 is a WTRU. The device 200 includes a receiver 202, a rule application device 204 in communication with the receiver 202, a message accepting device 206 in communication with the rule application device 204, and a message rejecting device 208 in communication with the rule application device 204. In operation, the receiver 202 receives an incoming RRC message for the device 200. The rule application device 204 applies a message validation rule to the received message and checks the configured state of the WTRU. If the message passes the validation rule or is not configured for the CELL_DCH state, then the message accepting device 206 takes the message and processes it accordingly. If the message fails the validation rule and is configured for the CELL_DCH state, then the message is passed to the message rejecting device 208 and is discarded.

Although the features and elements of the present invention are described in the preferred embodiments in particular combinations, each feature or element can be used alone without the other features and elements of the preferred embodiments or in various combinations with or without other features and elements of the present invention.

What is claimed is:

1. A method for validating radio resource control (RRC) messages, comprising:
   receiving an RRC message at a wireless transmit/receive unit (WTRU);
   determining whether the RRC message is valid by applying a transport format combination set (TFCS) validation rule to the RRC message, the validation rule based on an RRC state for which the WTRU is configured and whether the WTRU needs a new TFCS as determined by the RRC message, wherein the determining includes determining whether the RRC message will configure the WTRU for a CELL_DCH state;
   accepting the RRC message on a condition that RRC message is valid; and
   rejecting the RRC message on a condition that the RRC message is not valid.

2. The method according to claim 1, wherein the RRC message is valid on a condition that the WTRU receives a new TFCS.

3. The method according to claim 1, wherein the RRC message is valid on a condition that the RRC message will not configure the WTRU for the CELL_DCH state.

4. The method according to claim 1, wherein said determining includes:
   determining whether the RRC message will configure the WTRU for a CELL_DCH state; and
   determining whether the WTRU needs a new TFCS based on the RRC message.

5. The method according to claim 4, wherein the RRC message is valid on a condition that:
   the RRC message will configure the WTRU for the CELL_DCH state; and
   the WTRU does not need a new TFCS.

6. A wireless transmit/receive unit (WTRU) for validating radio resource control (RRC) messages, comprising:
   a receiver, configured to receive an RRC message;
   a rule application device, configured to determine whether the RRC message is valid by applying a transport format combination set (TFCS) validation rule, the validation rule based on an RRC state for which the WTRU is configured and whether the WTRU needs a new TFCS as determined by the RRC message, wherein the rule application device is further configured to determine whether the RRC message will configure the WTRU for a CELL_DCH state;
   a message accepting device, configured to accept the RRC message on a condition that the RRC message is valid; and
   a message rejecting device, configured to reject the RRC message on a condition that the RRC message is not valid.

7. The WTRU according to claim 6, wherein the RRC message is valid on a condition that the WTRU receives a new TFCS.

8. The WTRU according to claim 6, wherein the RRC message is valid on a condition that the RRC message will not configure the WTRU for the CELL_DCH state.

9. The WTRU according to claim 7, wherein said rule application device is further configured to:
   determine whether the RRC message will configure the WTRU for a CELL_DCH state; and
   determine whether the WTRU needs a new TFCS based on the RRC message.

10. The WTRU according to claim 9, wherein the RRC message is valid on a condition that:
   the RRC message will configure the WTRU for the CELL_DCH state; and
   the WTRU does not need a new TFCS.

* * * * *